US006679567B1

(12) United States Patent  (10) Patent No.: US 6,679,567 B1
Tackett et al.  (45) Date of Patent: Jan. 20, 2004

(54) CONTROL VALVE WITH OVERMOLDED ARMATURE FOR A HYDRAULIC CONTROL UNIT

(75) Inventors: Wendell D. Tackett, Ann Arbor, MI (US); Herbert L. Linkner, Jr., Dexter, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 09/658,542

(22) Filed: Sep. 9, 2000

(51) Int. Cl.[7] .................................................. B60T 8/36
(52) U.S. Cl. ............................... 303/119.2; 251/129.15
(58) Field of Search ......................... 303/119.1, 119.2, 303/119.3; 251/129.02, 129.08, 129.15; 137/269, 270, 271

(56) References Cited

U.S. PATENT DOCUMENTS

| | | | | |
|---|---|---|---|---|
| 3,013,768 A | * | 12/1961 | La Mastra | 251/129.15 |
| 3,307,585 A | * | 3/1967 | Schilling et al. | 137/625.66 |
| 3,346,004 A | | 10/1967 | Costello | 137/271 |
| 3,829,060 A | | 8/1974 | von Lewis | 251/129.02 |
| 4,004,343 A | * | 1/1977 | Marsden | 29/596 |
| 4,286,626 A | | 9/1981 | Leiber | |
| 4,596,267 A | * | 6/1986 | Tosseghini | 137/270 |
| 4,756,331 A | * | 7/1988 | Stegmaier | 137/271 |
| 4,790,345 A | * | 12/1988 | Kolchinsky | 137/269 |
| 4,901,974 A | * | 2/1990 | Cook et al. | 251/129.15 |
| 4,951,703 A | | 8/1990 | Brehm et al. | |
| 4,967,786 A | * | 11/1990 | DuHack | 251/129.15 |
| 4,977,922 A | * | 12/1990 | McWilliams | 137/269 |
| 5,002,835 A | * | 3/1991 | Nijland et al. | 428/577 |
| 5,088,520 A | * | 2/1992 | Haynes et al. | 137/270 |
| 5,114,116 A | | 5/1992 | Muller et al. | 251/129.15 |
| 5,135,027 A | | 8/1992 | Miki et al. | |
| 5,143,345 A | | 9/1992 | Miki et al. | |
| 5,246,199 A | * | 9/1993 | Numoto et al. | 251/129.15 |
| 5,261,731 A | | 11/1993 | Yogo et al. | |
| 5,364,067 A | | 11/1994 | Linkner, Jr. | |
| 5,402,093 A | * | 3/1995 | Gibas et al. | 251/129.15 |
| 5,439,279 A | | 8/1995 | Linkner, Jr. et al. | |
| 5,467,961 A | * | 11/1995 | Sausner et al. | 251/129.15 |
| 5,476,243 A | | 12/1995 | Oehler et al. | |
| 5,605,386 A | | 2/1997 | Ziegler et al. | |
| 5,669,406 A | | 9/1997 | Gluf, Jr. | |
| 5,673,980 A | | 10/1997 | Schwarz et al. | |
| 5,681,098 A | | 10/1997 | Ganzel et al. | |
| 5,709,370 A | * | 1/1998 | Kah, Jr. | 251/129.15 |
| 5,775,670 A | * | 7/1998 | Osterbrink | 251/129.15 |
| 5,791,747 A | | 8/1998 | Sorensen et al. | |
| 5,795,038 A | * | 8/1998 | Fuller et al. | 303/119.2 |
| 5,879,060 A | | 3/1999 | Megerle et al. | |
| 6,065,734 A | * | 5/2000 | Tackett et al. | 303/119.2 |
| 6,206,038 B1 | * | 3/2001 | Klein et al. | 303/119.2 |
| 6,213,572 B1 | * | 4/2001 | Linkner, Jr. et al. | 303/119.2 |
| 6,302,499 B1 | * | 10/2001 | Linkner, Jr. et al. | 303/119.2 |
| 6,345,870 B1 | * | 2/2002 | Linkner, Jr. et al. | 303/119.2 |

FOREIGN PATENT DOCUMENTS

| | | |
|---|---|---|
| DE | 40 31 885 A1 | 4/1992 |
| WO | WO 98/24669 * | 6/1998 |

* cited by examiner

Primary Examiner—Jack Lavinder
Assistant Examiner—Thomas J. Williams
(74) Attorney, Agent, or Firm—MacMillan, Sobanski & Todd, LLC

(57) ABSTRACT

A control valve for controlling fluid flow in a hydraulic control unit of a vehicular brake system includes a valve seat. A sleeve is mounted on the valve seat. An armature core is slidably received in the sleeve. The armature core has a passage extending between first and second planar end surfaces of the armature core. An armature body is formed from a moldable material onto the armature core. The armature body has a central section received in the passage of the armature core, a first end section extending from the first end surface of the armature core, and a second end section extending from the second end surface of the armature core. This control valve is particularly adapted to be mounted in a bore of a housing of a hydraulic control unit of an electronically controlled vehicular brake system.

15 Claims, 14 Drawing Sheets

CONTROL VALVE WITH OVERMOLDED ARMATURE FOR A HYDRAULIC CONTROL UNIT

BACKGROUND OF THE INVENTION

This invention relates in general to vehicular brake systems, and in particular is concerned with a control valve mounted in a hydraulic control unit of an electronically controlled brake system.

Electronically-controlled brake systems for vehicles are well known. One type of electronically-controlled brake system includes a hydraulic control unit (HCU) connected in fluid communication between a master cylinder and a plurality of wheel brakes. The HCU includes a housing containing control valves and other components for selectively controlling hydraulic brake pressure at the wheel brakes.

Control valves for HCU's are commonly formed as electronically actuated solenoid valves. A typical solenoid valve includes a cylindrical armature slidably received in a sleeve or flux tube for movement relative to a valve seat. A spring is used to bias the armature in an open or closed position, thereby permitting or blocking fluid flow through the valve, respectively. A coil assembly is provided about the sleeve. When the valve is energized, an electromagnetic field or flux generated by the coil assembly slides the armature from the biased open or closed position to a closed or open position, respectively.

Control valves mounted in a HCU are actuated by an electronic control module to provide desired braking functions such as anti-lock braking, traction control, and vehicle stability control.

To provide desired braking responses, an armature must respond quickly and in a predictable manner to an electromagnetic field generated by an energized coil assembly.

SUMMARY OF THE INVENTION

This invention relates to a control valve mounted in a hydraulic control unit of a vehicular brake system. The control valve includes an overmolded armature slidably received in a sleeve. The armature reciprocates in the sleeve quickly and in a predictable manner when a coil assembly is energized.

In a preferred embodiment, a control valve for controlling fluid flow in a hydraulic control unit of a vehicular brake system includes a valve seat. A sleeve is mounted on the valve seat. An armature core is slidably received in the sleeve. The armature core has a passage extending between first and second planar end surfaces of the armature core. An armature body is formed from a moldable material onto the armature core. The armature body has a central section received in the passage of the armature core, a first end section extending from the first end surface of the armature core, and a second end section extending from the second end surface of the armature core.

This control valve is particularly adapted to be mounted in a bore of a housing of a hydraulic control unit of an electronically controlled vehicular brake system.

Various objects and advantages of this invention will become apparent to those skilled in the art from the following detailed description of the preferred embodiment, when read in light of the accompanying drawings.

DETAILED DESCRIPTION OF THE PREFERRED EMBODIMENTS

Figure 1:
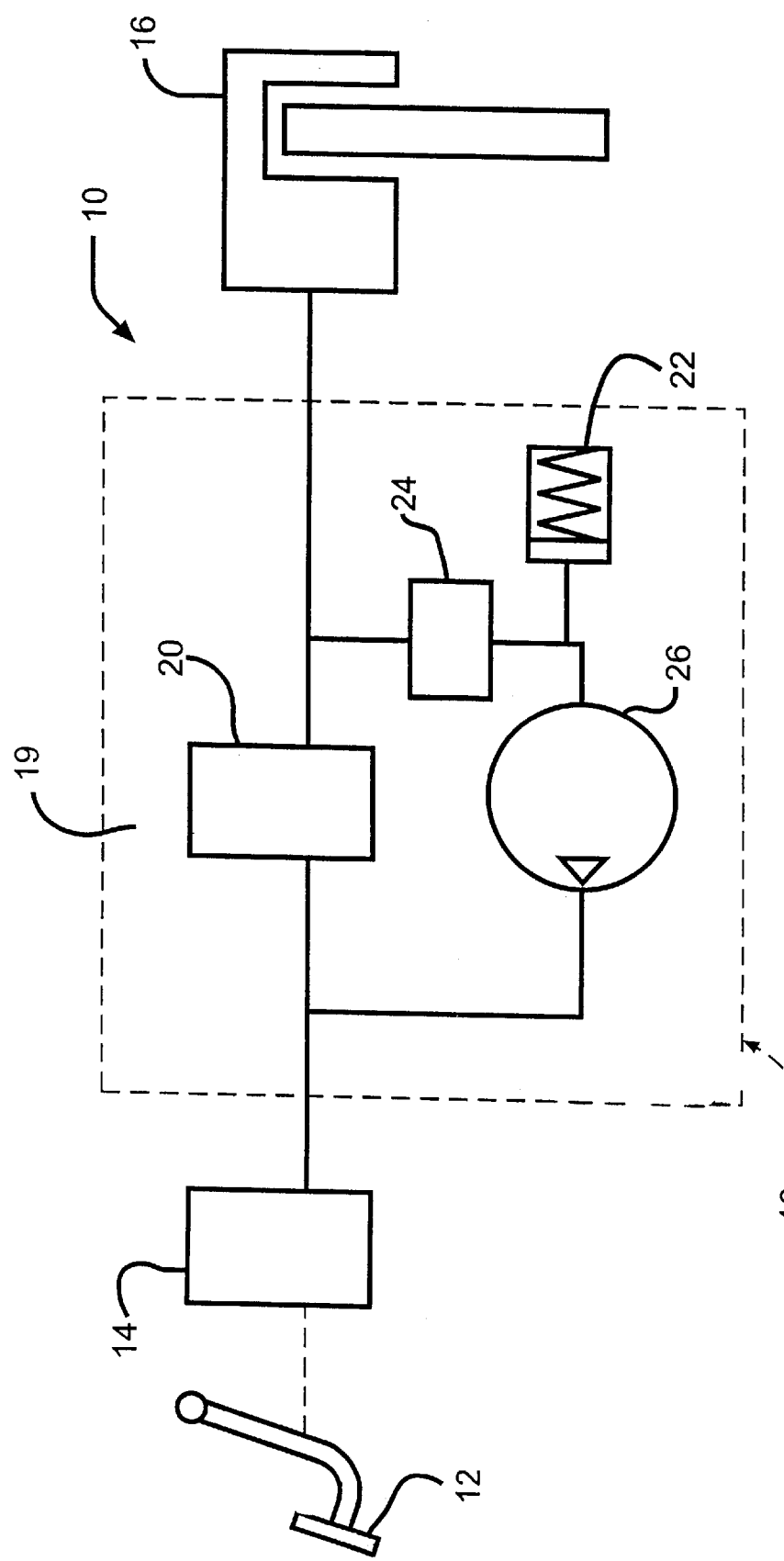
FIG. 1 is a schematic diagram of a vehicular braking system according to the present invention illustrating a hydraulic control unit having a normally open control valve, a normally closed control valve, an accumulator, and a pump.

A vehicular brake system according to this invention is indicated generally at 10 in FIG. 1. System 10 includes valves and other components described below to provide an anti-lock braking function. In other embodiments, system 10 can also include components to provide traction control and/or vehicle stability control functions. In yet other embodiments, system 10 can be formed as an electronic brake management system.

The brake system 10 includes a brake pedal 12 connected to a master cylinder 14 for providing pressurized brake fluid to a plurality of wheel brakes 16, only one of which is shown. The wheel brake 16 is illustrated as a disc brake. However, the wheel brake 16 may be any type found on vehicles, including a drum brake.

The brake system 10 also includes a hydraulic control unit (HCU) 18 connected in fluid communication between the master cylinder 14 and each wheel brake 16. The HCU 18 includes a housing 19 having bores for receiving control valves and other components described below. Fluid conduits are provided between the bores to provide fluid communication between the valves and other components. For purposes of clarity of illustration, only one set of components are illustrated in FIG. 1. Typically, however, the HCU 18 also houses corresponding components for other circuits and/or wheels of the vehicle.

The HCU 18 includes a normally open control valve 20, commonly known as an isolation valve, disposed between the master cylinder 14 and the wheel brake 16, at least one low pressure accumulator 22, a normally closed control valve 24, commonly known as a dump valve, disposed between the wheel brake 16 and the low pressure accumulator 22, and a hydraulic pump 26 connected between the low pressure accumulator 22 and an inlet to control valve 20. The HCU 18 may also include other fluid flow devices such as an attenuator, restricted orifices, and check valves (none of which are illustrated), depending upon the system design. Control valve 20 is preferably formed as a solenoid valve switchable between two positions. Control valve 24 is preferably formed as a solenoid valve switchable between two positions. Valves 20 and 24, as well as pump 26, are electrically connected to an electronic control module (not illustrated) and operated to provide desired system braking in a well-known manner.

Figure 2:
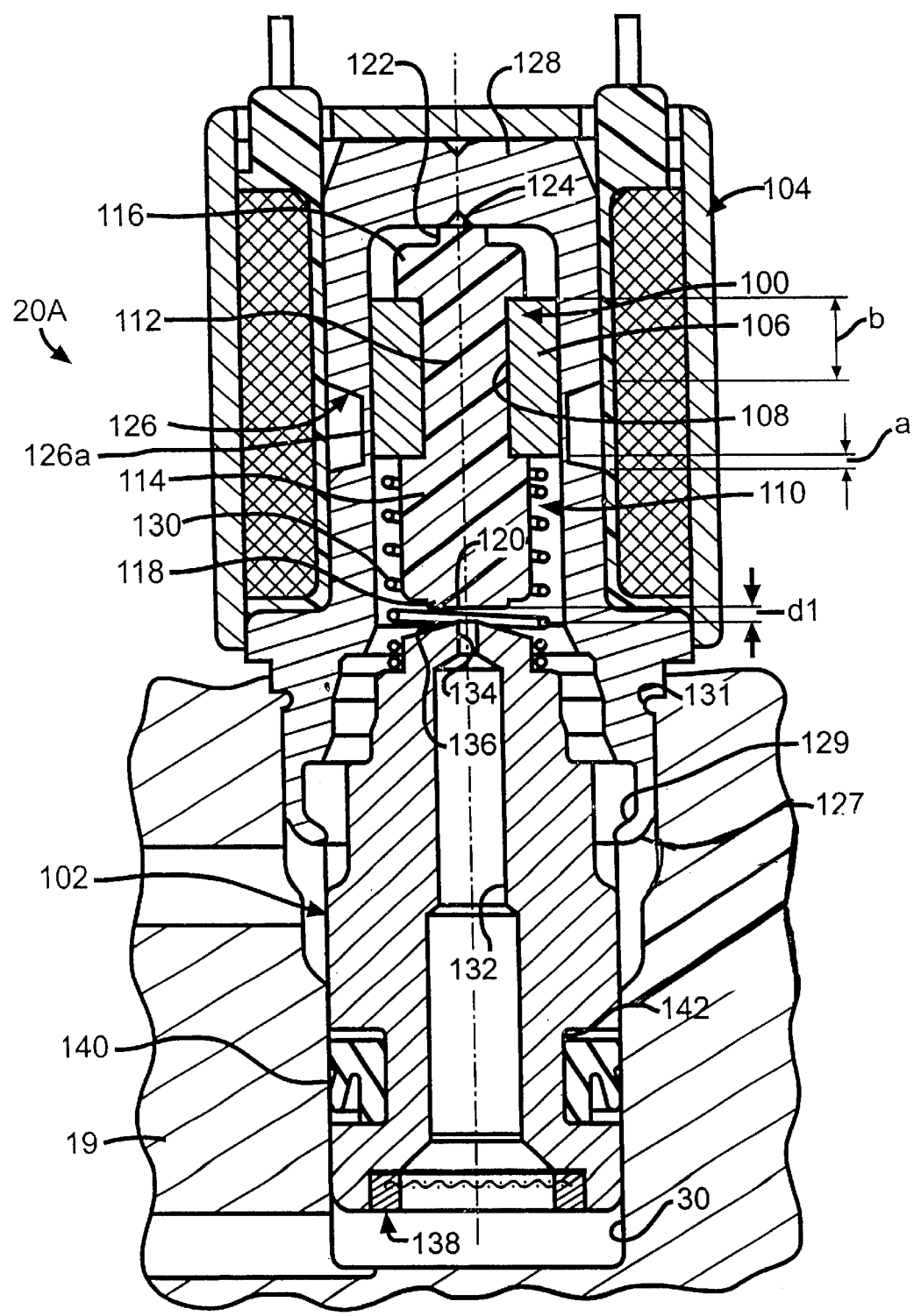
FIG. 2 is a sectional view through the hydraulic control unit of FIG. 1 illustrating a first embodiment of the normally open control valve according to this invention.

A sectional view of a first embodiment of the isolation valve 20 is indicated generally at 20A in FIG. 2. The isolation valve 20A is received in a bore 30 formed in the housing 19. As described below in detail, the isolation valve 20A includes an armature 100 biased away from a valve seat 102 when the valve 20A is not energized. When a coil assembly 104 is energized to produce an electromagnetic field, the armature 100 is pulled toward the valve seat 102 to close fluid flow through the valve 20A.

The armature 100 is formed as a subassembly and then assembled with the remainder of the valve 20A. The armature 100 includes an armature core 106 formed as a hollow cylinder from a ferromagnetic material. Preferably, each end of the armature core 106 is a planar surface. The armature core 106 includes a longitudinal (preferably axial) passage 108. The longitudinal passage 108 can be formed as a bore. Preferably, the longitudinal passage 108 is formed with a constant diameter.

The armature 100 also includes an armature body 110. Preferably, the armature body 110 is formed from a molded material such as polyphenylene sulfide (PPS) or polypthalamide (PPA). The armature core 106 can be placed in a mold. Then the desired material can be injected into the mold to form the is armature body 110. The armature body 110 includes a central section 112 that fills the longitudinal passage 108 of the armature core 106. A first end section 114 and a second end section 116 are formed at opposite ends of the central section 112. Each of the first and second end sections 114 and 116 extend beyond an end surface of the armature core 106 a predetermined distance. Each of the first and second end sections 114 and 116 has an outer diameter less than an outer diameter of the armature core 106. The outer diameters of the first and second end sections 114 and 116 are greater than an outer diameter of the central section 112. The first end section 114 preferably terminates in a projecting stub 118. The stub 118 preferably terminates in a planar end surface 120. The second end section 114 preferably terminates in a projecting stub 122. The stub 122 preferably terminates in a planar end surface 124. This formation and structure can be described as an armature core 106 having an overmolded armature body 110.

The armature 100 is slidably received in a sleeve or flux tube 126 having a closed end 128. A spring 130 biases the armature 100 away from the valve seat 102. An annular portion 127 adjacent an open end of the sleeve 126 is crimped onto an annular flange 129 formed on the valve seat 102. The combined sleeve 126 and valve seat 102 containing the armature 100 is retained in the bore 30 by any desired means including material of the housing 19 forced into a groove 131 formed in the outer surface of the sleeve 126.

The sleeve 126 includes a flux brake or region of increased electromagnetic reluctance. In the embodiments illustrated in FIGS. 2 and 3, the flux brake is an annular groove 126a in the ferromagnetic material of the sleeve 126.

The valve seat 102 includes a longitudinal fluid passage 132 that terminates in a reduced diameter opening 134. A seat 136 having an angle of approximately four degrees (as measured from a plane tangent to a terminus of the seat 136 to the downwardly sloping surface surrounding the terminus) is formed on an outer surface of the valve seat 102. The planar end surface 120 of stub 118 acts as a valve sealing element and engages the seat 136 when the armature 100 moves downwardly. When the stub 118 engages the seat 136, flow through fluid passage 132 and opening 134 is blocked. When the coil assembly 104 is not energized, the planar end surface 120 is spaced a distance d1 from the seat 136. At this position, the planar end surface 124 engages an inner surface of the closed end 128.

When the armature 100 is inserted in the sleeve 126 in an orientation as illustrated in FIG. 2, the second end section 116 of the armature body 110 is at one extreme of travel toward the closed end 128 of the sleeve 126. Additionally, a distance b between an end of the armature core 106 nearest the second end 116 of the armature body 110 and a first junction, or edge of the groove 126a nearest the closed end 128 of the sleeve 126, is greater than a distance a between an opposite end of the armature core and a second junction, or edge of the groove 126a nearest the open end of the sleeve 126.

A filter assembly 138 is provided adjacent an inlet of the fluid passage 132. A lip seal 140 is provided in a groove 142 formed in an outer surface of the valve seat 102.

The armature 100 provides a responsive, economical element that reciprocates in the sleeve 126 during operation of the valve 20A to provide desired braking responses in the system 10.

Figure 3:
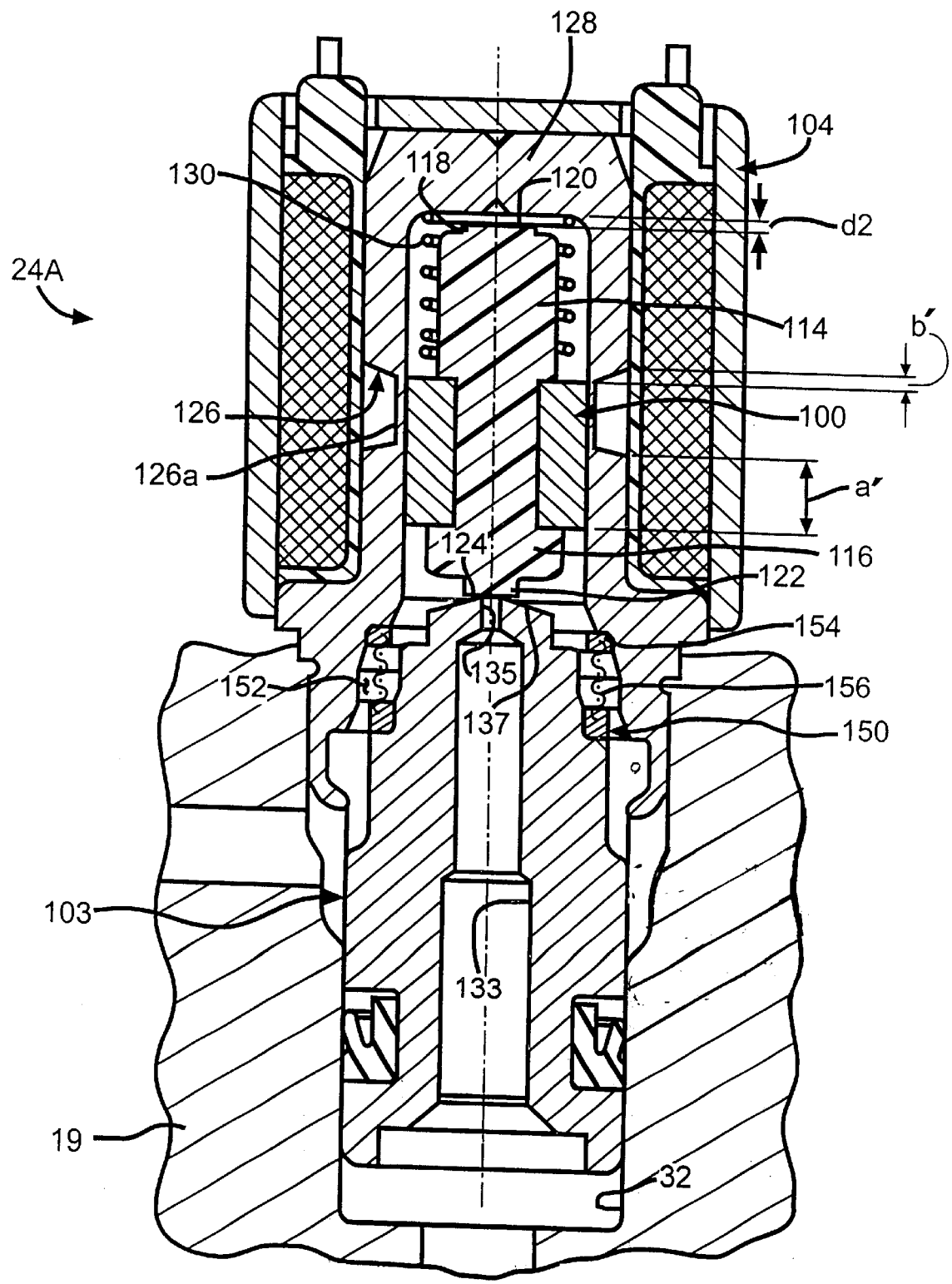
FIG. 3 is a sectional view through the hydraulic control unit of FIG. 1 illustrating a first embodiment of the normally closed control valve according to this invention.

A sectional view of a first embodiment of the dump valve 24 is indicated generally at 24A in FIG. 3. The dump valve 24A is received in a bore 32 formed in the housing 19. Preferably, the dump valve 24A includes many components identical to the isolation valve 20A of FIG. 2, including an armature 100, a coil assembly 104, and a sleeve 126. When the coil assembly 104 is not energized, the armature 100 is urged into contact with a valve seat 103 by a spring 130 to block fluid flow through the dump valve 24A. When the coil assembly 104 is energized, the armature 100 is urged toward a closed end 128 of the sleeve to permit fluid flow through the dump valve 24A.

As stated above, the armature 100 in dump valve 24A is preferably identical to armature 100 in isolation valve 20A of FIG. 2. Preferably, the armature 100 in dump valve 24A is inverted (rotated 180 degrees) when compared to the orientation of armature 100 in isolation valve 20A.

Armature 100 in dump valve 24A includes an armature core 106 and an overmolded armature body 110. A planar end surface 124 of stub 122 of the second end section 116 is engaged with a seat 137 formed on the valve seat 103 by a spring 130. When the coil assembly 104 is energized, the armature 100 is pulled away from the valve seat 103 so that fluid can flow through a fluid passage 133 and a reduced diameter opening 135 in the valve seat 103. When the coil assembly 104 is not energized, planar end surface 120 is spaced a predetermined distance d2 from an inner surface of the closed end 128.

When the armature 100 is inserted in the sleeve 126 in an orientation as illustrated in FIG. 3, the second end section 116 of the armature body 110 is at another extreme of travel toward the open end the sleeve 126. Additionally, a distance a' between an end of the armature core 106 nearest the second end 116 of the armature body 110 and the second junction, or edge of the groove 126a nearest the open end of the sleeve, is greater than a distance b' between an opposite end of the armature core and the first junction, or edge of the groove 126a nearest the closed end 128 of the sleeve 126.

An internal band filter 150 is placed between the sleeve 126 and the valve seat 103. Preferably, the band filter 150 is received in a pocket 152 formed between the sleeve 126 and the valve seat 103. The band filter 150 includes a ring 154 and a filter material 156. The band filter 152 is less prone to damage during assembly and installation of the valve 24A after the sleeve 126 has been crimped onto the valve seat 103.

Figures 4, 5:
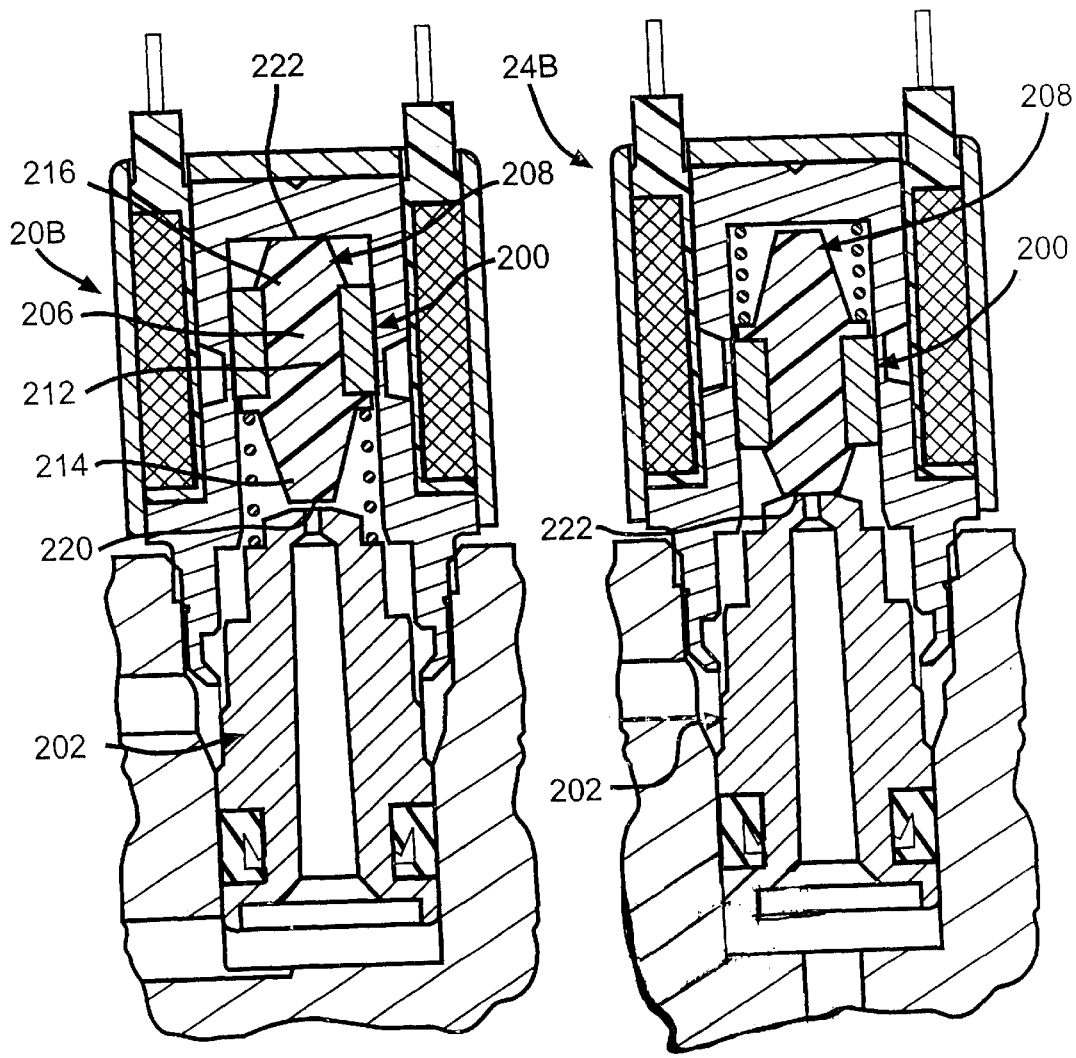
FIG. 4 is a sectional view through the hydraulic control unit of FIG. 1 illustrating a second embodiment of the normally open control valve according to this invention.
FIG. 5 is a sectional view through the hydraulic control unit of FIG. 1 illustrating a second embodiment of the normally closed control valve according to this invention.

A second embodiment of control valve 20 for system 10 is indicated generally at 20B in FIG. 4. The normally open isolation valve 20B includes an armature 200 having an armature core 206 and an overmolded armature body 208. The armature body 208 includes a central section 212, a first end section 214, and second end section 216. The first end section 214 is formed with a tapered or conical outer configuration terminating in a planar end surface 220. The second end section 216 is formed with a tapered or conical outer configuration terminating in a planar end surface 222.

The armature 200 cooperates with a valve seat 202 to permit and block fluid flow through the valve 20B in a manner similar to valve 20A.

A second embodiment of control valve 24 for system lo is indicated generally at 24B in FIG. 5. The normally closed dump valve 24B includes an armature 200 identical to armature 200 of control valve 20B. Furthermore, dump valve 24B also includes other elements identical to control valve 20B, including valve seat 202. The armature 200 cooperates with a valve seat 202 to permit and block fluid flow through the valve 24B in a manner similar to valve 24A.

Figure 6:
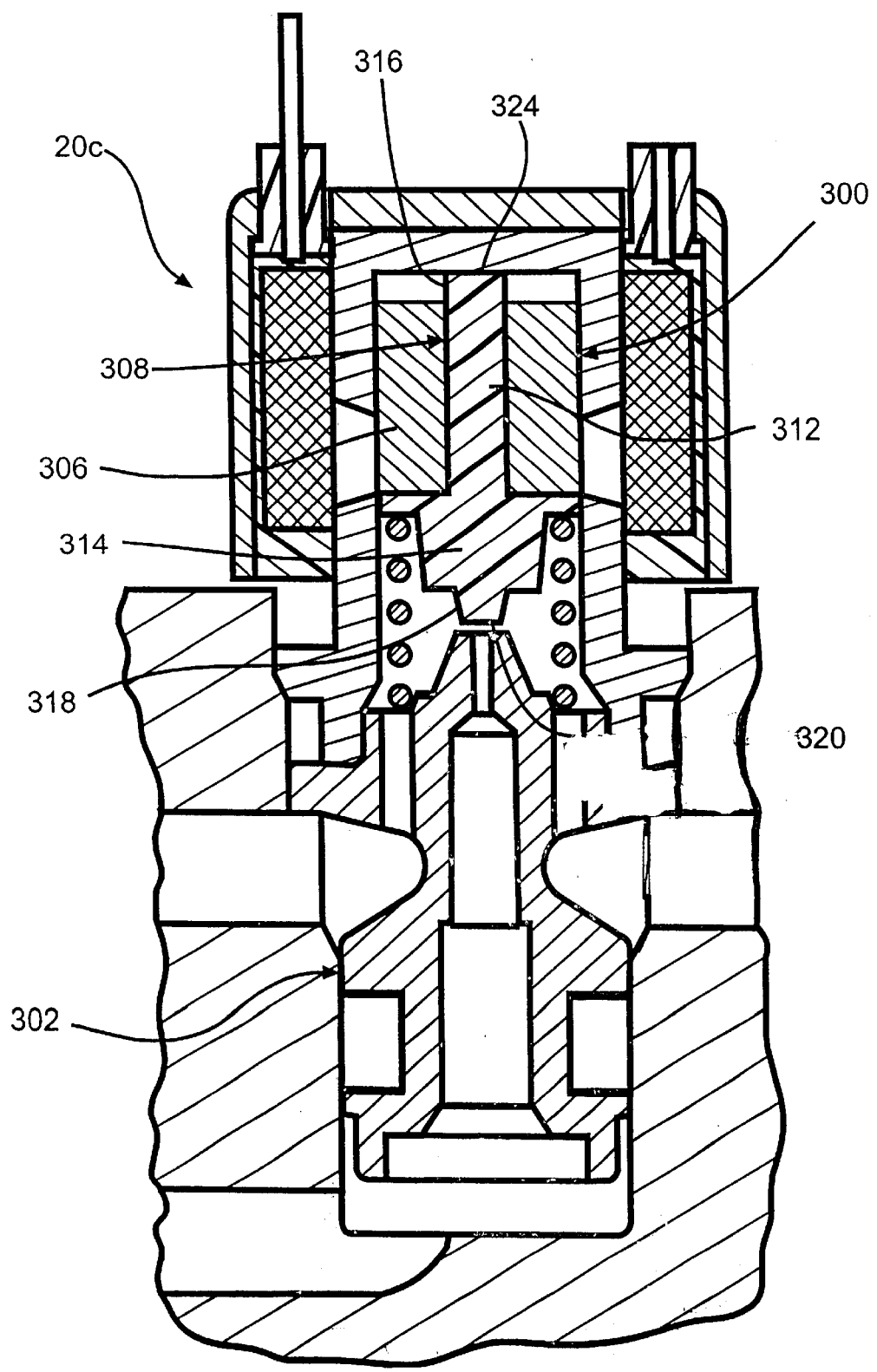
FIG. 6 is a sectional view through the hydraulic control unit of FIG. 1 illustrating a third embodiment of the normally open control valve according to this invention.

A third embodiment of control valve 20 for system 10 is indicated generally at 20C in FIG. 6. The normally open isolation valve 20C includes an armature 300 having an armature core 306 and an overmolded armature body 308. The armature body 308 includes a central section 312, a first end section 314, and second end section 316. The first end section 314 extends from the armature core 306 and has an outer diameter greater than the central section 312. The first section 314 terminates in a projecting stub 318 having a planar end surface 320. The second end section 316 extends from the armature core 306 and has a diameter approximately equal to the central section 312. The second end section 316 terminates in a planar end surface 324.

The armature 300 cooperates with a valve seat 302 to permit and block fluid flow through the valve 20C in a manner similar to valve 20A.

Figure 7:
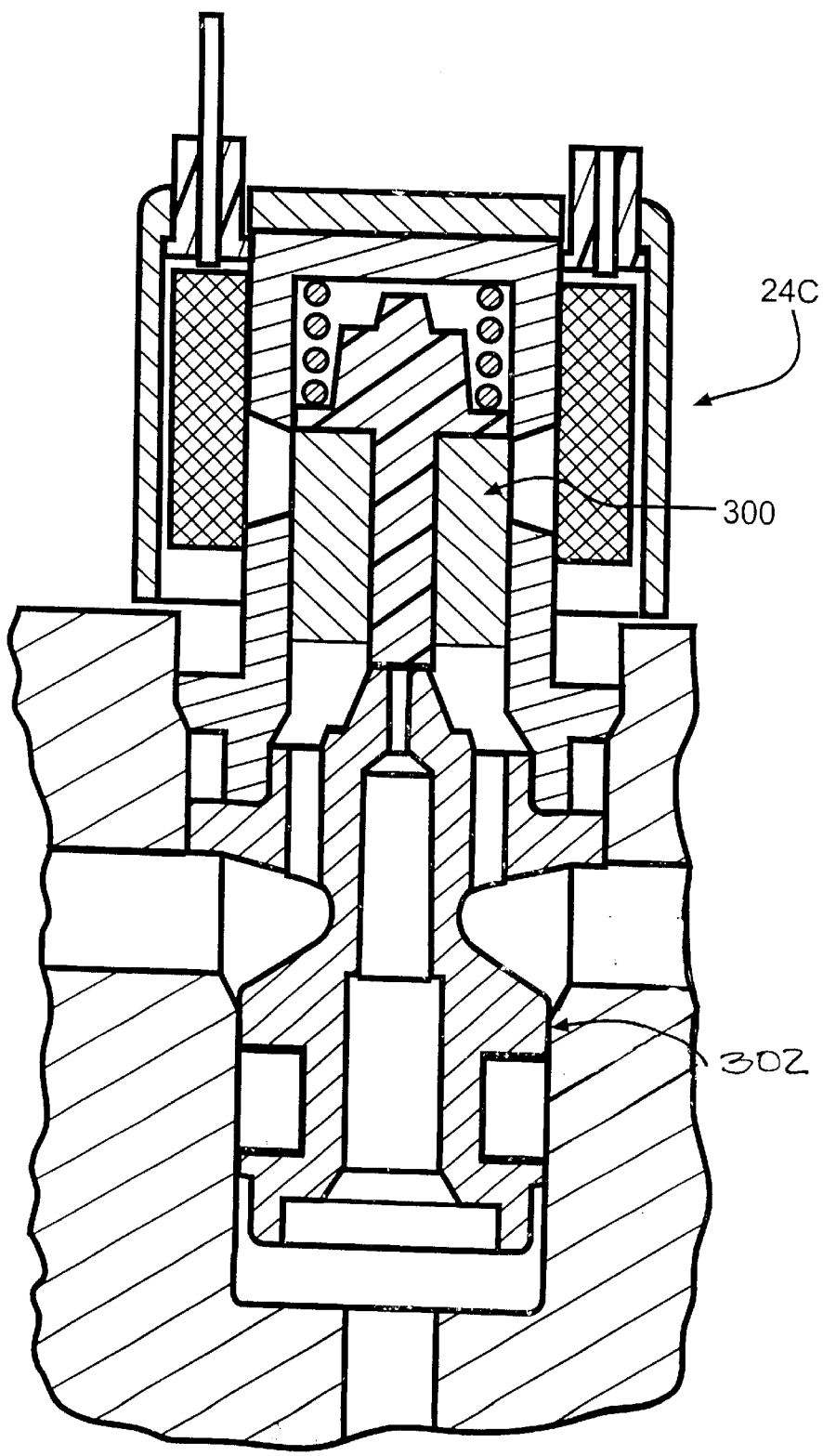
FIG. 7 is a sectional view through the hydraulic control unit of FIG. 1 illustrating a third embodiment of the normally closed control valve according to this invention.

A third embodiment of control valve 24 for system 10 is indicated generally at 24C in FIG. 7. The normally closed dump valve 24C includes an armature 300 identical to armature 300 of control valve 20C. Furthermore, dump valve 24C also includes other elements identical to control valve 20C, including valve seat 302. The armature 300 cooperates with a valve seat 302 to permit and block fluid flow through the valve 24C in a manner similar to valve 24A.

Figures 8, 9:
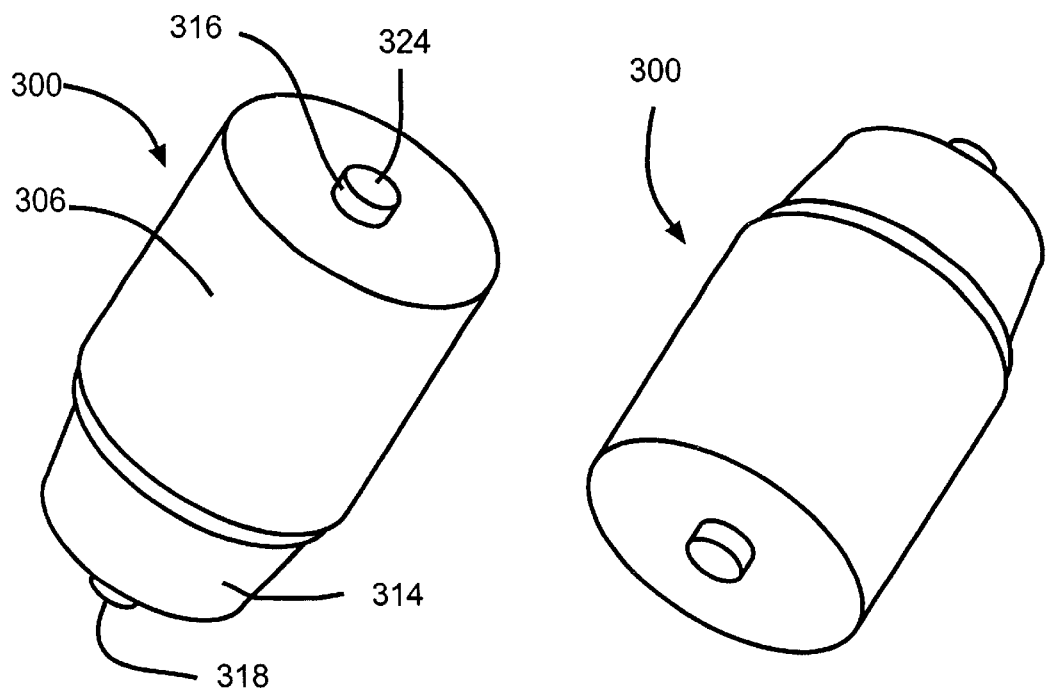
FIG. 8 is a perspective view of an armature removed from the control valves of FIGS. 6 and 7.
FIG. 9 is a perspective view of the armature of FIG. 8 rotated 180 degrees.

FIGS. 8 and 9 illustrate the armature 300 removed from the control valves 20C and 24C.

Figure 10:
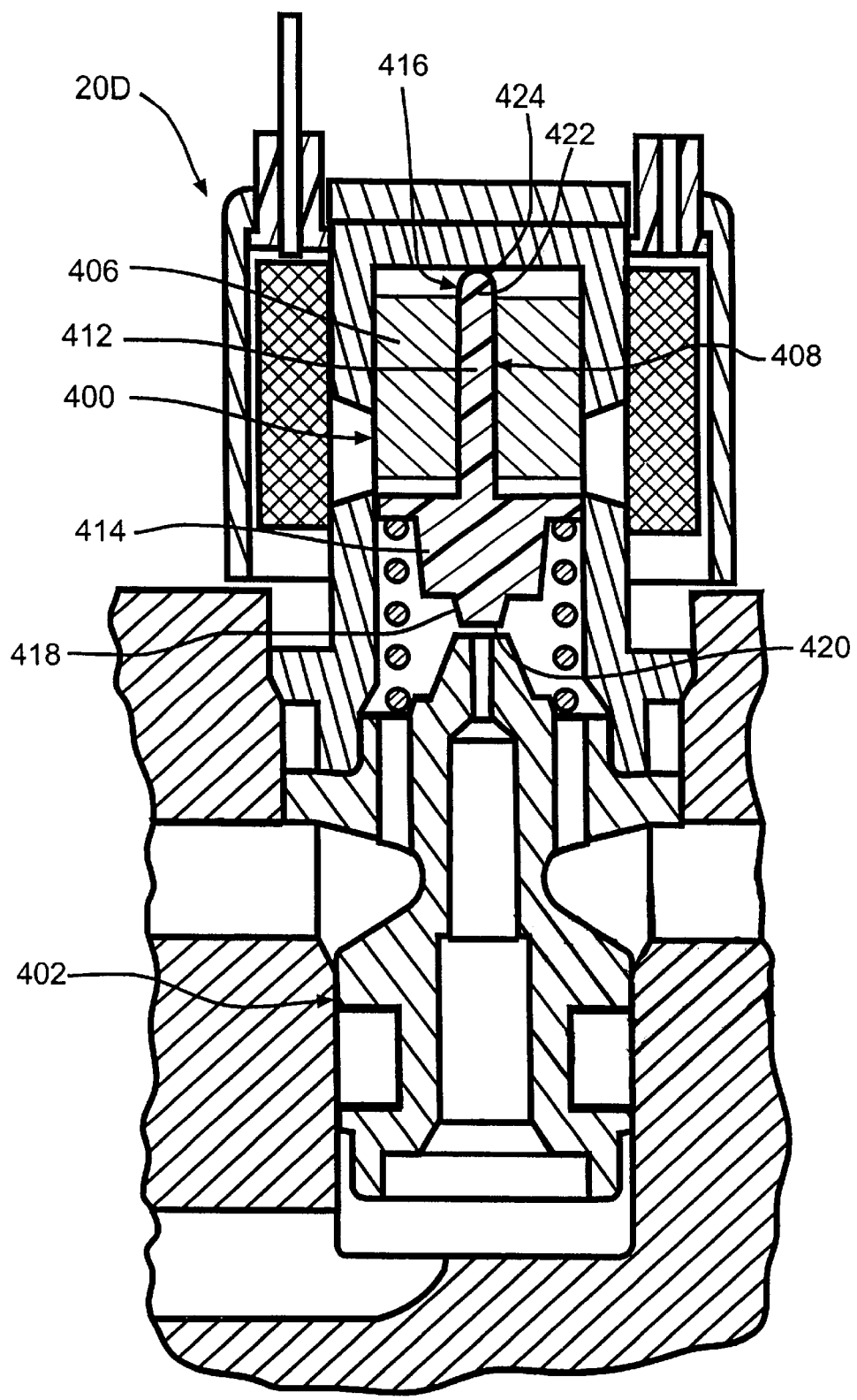
FIG. 10 is a sectional view through the hydraulic control unit of FIG. 1 illustrating a fourth embodiment of the normally open control valve according to this invention.

A fourth embodiment of control valve 20 for system 10 is indicated generally at 20D in FIG. 10. The normally open isolation valve 20D includes an armature 400 having an armature core 406 and an overmolded armature body 408. The armature body 408 includes a central section 412, a first end section 414, and second end section 416. The first end section 414 extends from the armature core 406 and has an outer diameter greater than the central section 412. The first section 414 terminates in a projecting stub 418 having a planar end surface 420. The second end section 416 extends from the armature core 406 and has a diameter approximately equal to the central section 412. The second end section 416 terminates in a projecting stub 422 having a rounded or semi-spherical end surface 424.

The armature 400 cooperates with a valve seat 402 to permit and block fluid flow through the valve 20D in a manner similar to valve 20A.

Figure 11:
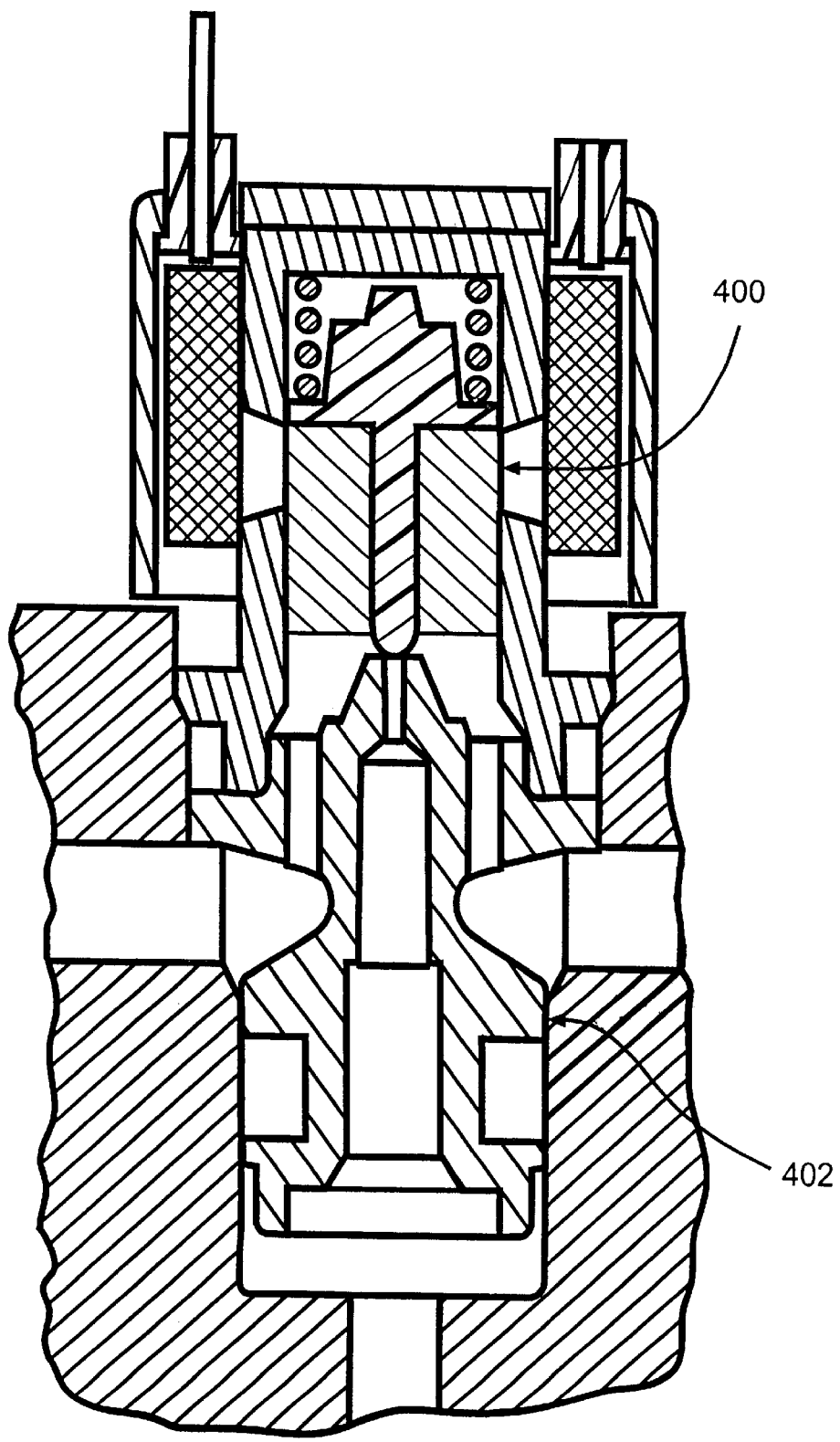
FIG. 11 is a sectional view through the hydraulic control unit of FIG. 1 illustrating a fourth embodiment of the normally closed control valve according to this invention.

A fourth embodiment of control valve 24A for system 10 is indicated generally at 24D in FIG. 11. The normally closed dump valve 24D includes an armature 400 identical to armature 400 of control valve 20D. Furthermore, dump valve 24D also includes other elements identical to control valve 20A, including valve seat 402. The armature 400 cooperates with a valve seat 402 to permit and block fluid flow through the valve 24D in a manner similar to valve 24A.

Figures 12, 13:
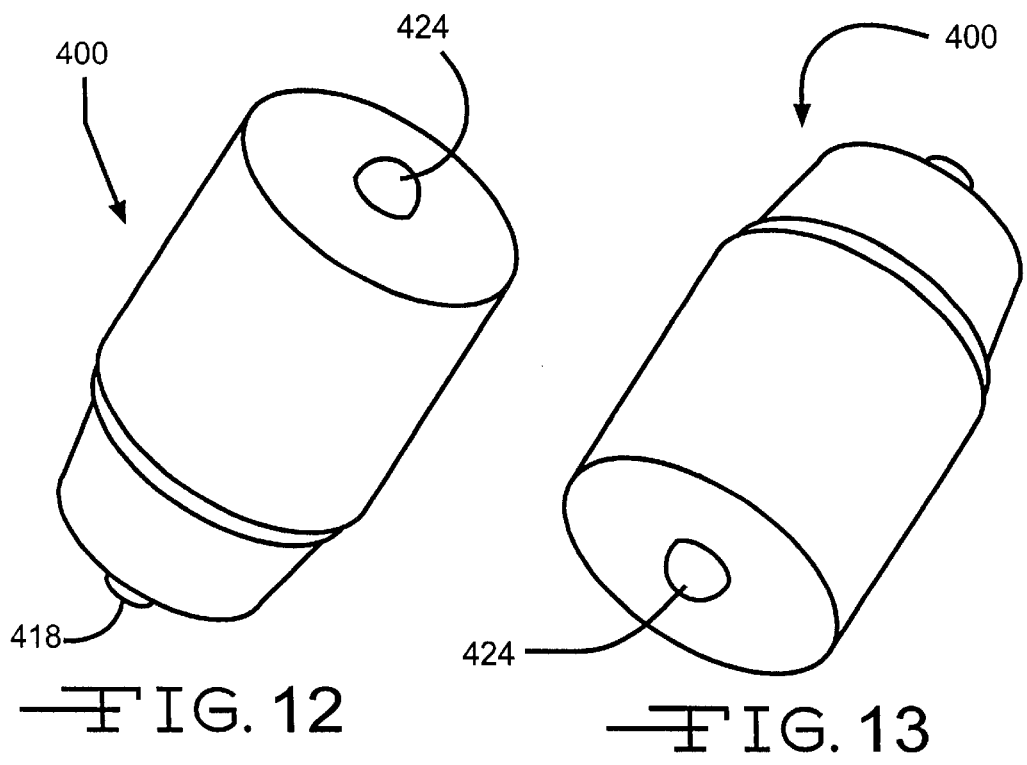
FIG. 12 is a perspective view of an armature removed from the control valves of FIGS. 10 and 11.
FIG. 13 is a perspective view of the armature of FIG. 12 rotated 180 degrees.

FIGS. 12 and 13 illustrate the armature 400 removed from the control valves 20D and 24D.

Figure 14:
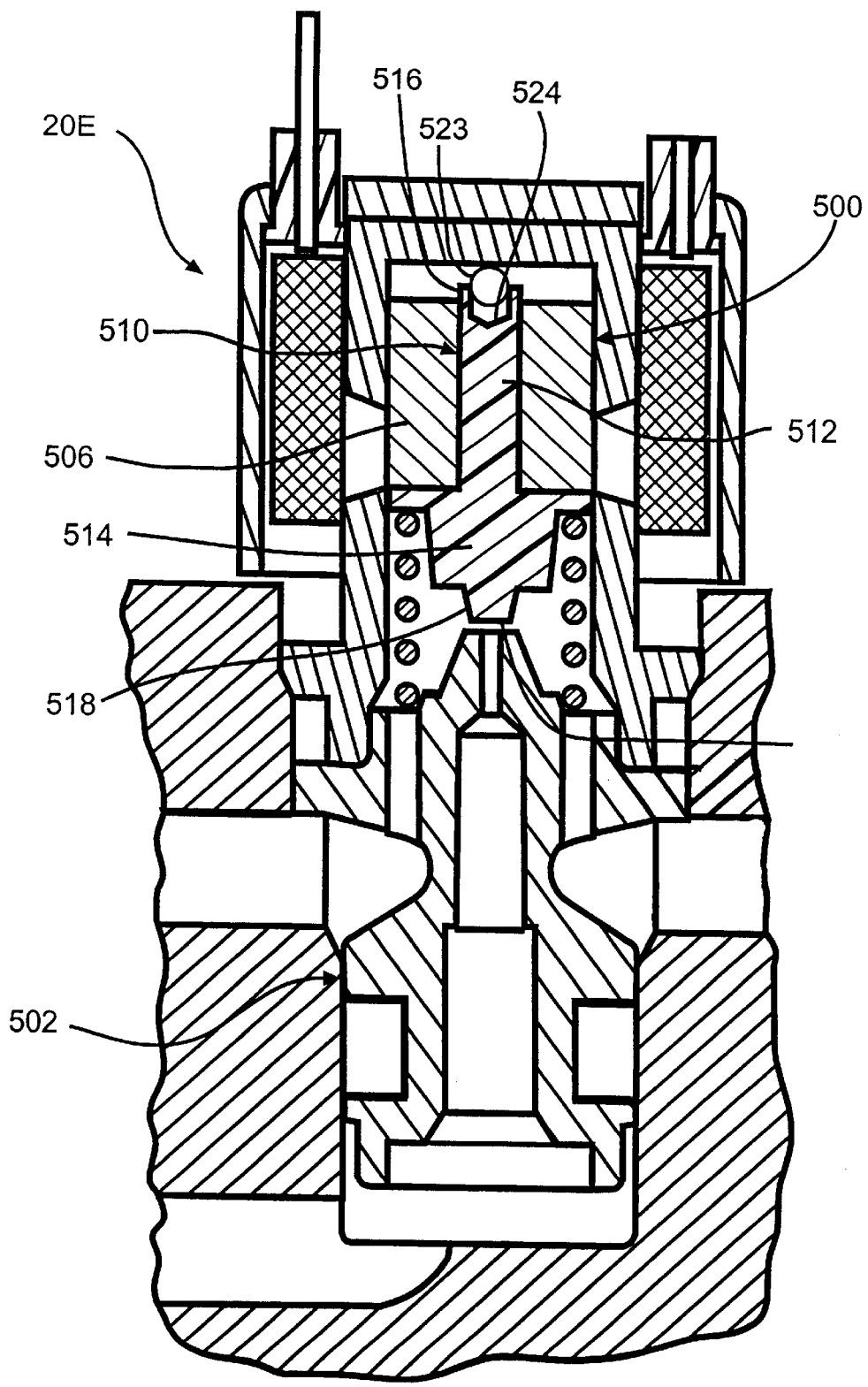
FIG. 14 is a sectional view through the hydraulic control unit of FIG. 1 illustrating a fifth embodiment of the normally open control valve according to this invention.

A fifth embodiment of control valve 20 for system 10 is indicated generally at 20E in FIG. 14. The normally open isolation valve 20E includes an armature 500 having an armature core 506 and an overmolded armature body 510. The armature body 510 includes a central section 512, a first end section 514, and a second end section 516. The first end section 514 extends from the armature core 506 and has an outer diameter greater than the central section 512. The first section 514 terminates a projecting stub 518 having a planar end surface 520. The second end section 516 is extends from the armature core 506 and has a diameter approximately equal to the central section 512. The second end section 516 terminates in ball 523 pressed into a cavity 525.

The armature 500 cooperates with a valve seat 502 to permit and block fluid flow through the valve 20E in a manner similar to valve 20A. The end surface 520 engages the valve seat 502 to close the valve 20E.

Figure 15:
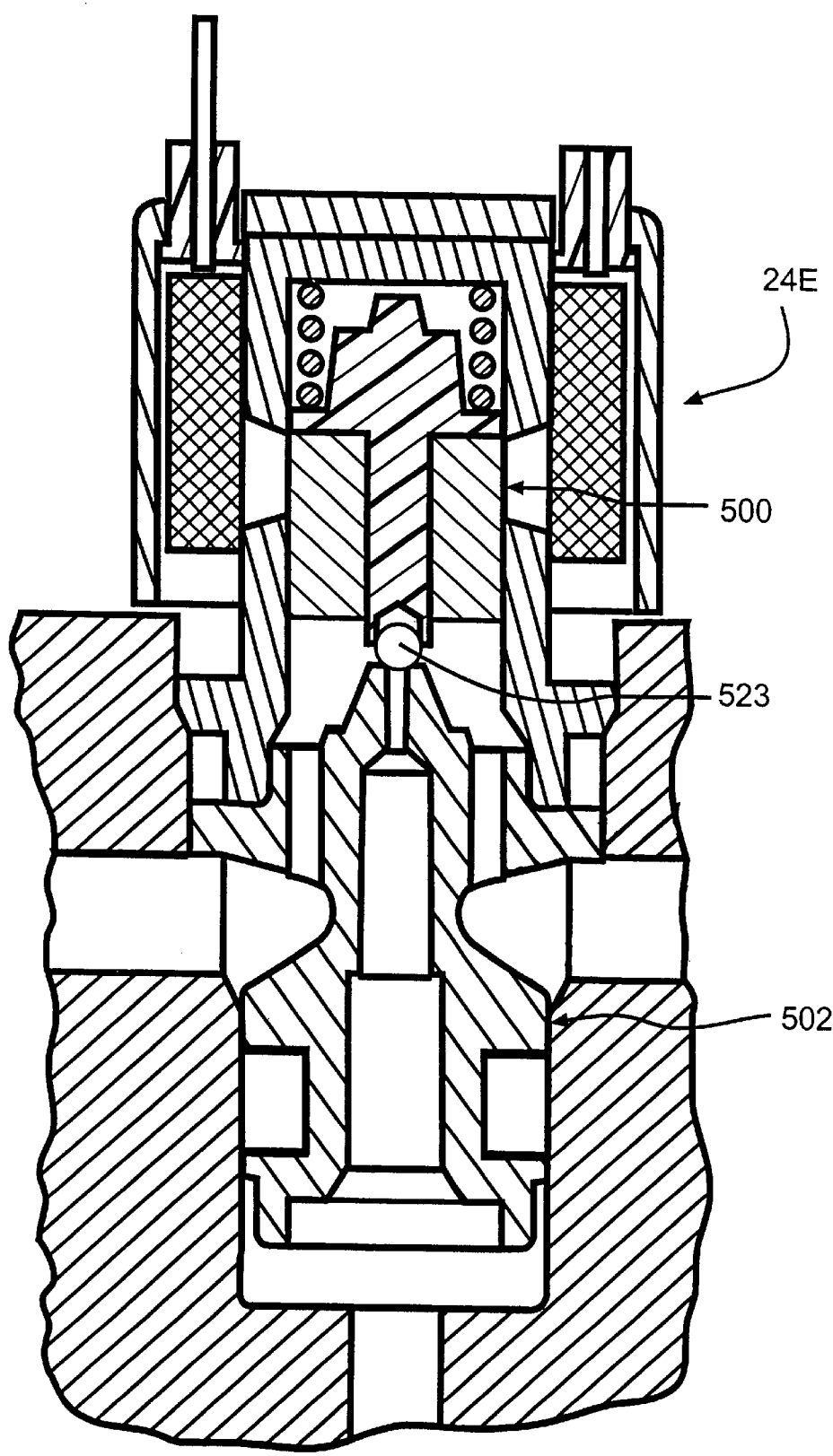
FIG. 15 is a sectional view through the hydraulic control unit of FIG. 1 illustrating a fifth embodiment of the normally closed control valve according to this invention.

A fifth embodiment of control valve 24 for system 10 is indicated generally at 24E in FIG. 15. The normally closed dump valve 24E includes an armature 500 identical to armature 500 of control valve 20E. Furthermore, dump valve 24E also includes other elements identical to control valve 20E, including valve seat 502. The armature 500 cooperates with a valve seat 502 to permit and block fluid flow through the valve 24E in a manner similar to valve 24A. The ball 523 is pulled away from the valve seat 502 to open the valve 24E.

Figure 16:
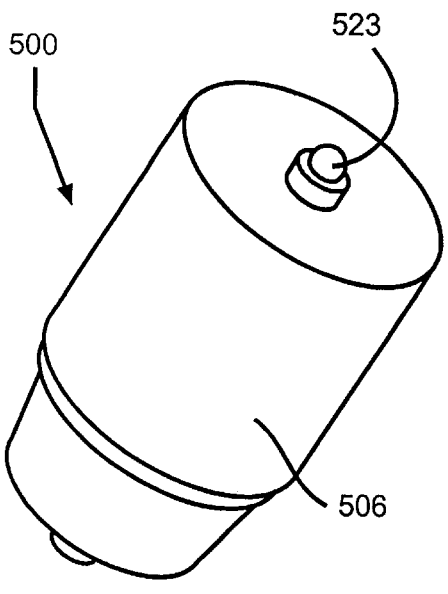
FIG. 16 is a perspective view of an armature removed from the control valves of FIGS. 14 and 15.
Figure 17:
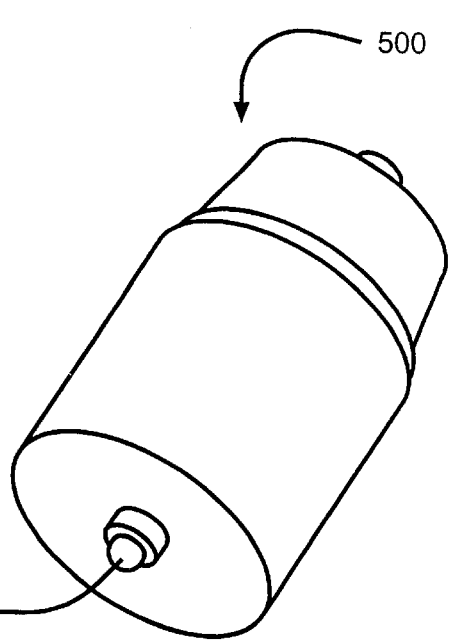
FIG. 17 is a perspective view of the armature of FIG. 16 rotated 180 degrees.

FIGS. 16 and 17 illustrate the armature 400 removed from the control valves 20E and 24E.

Figure 18:
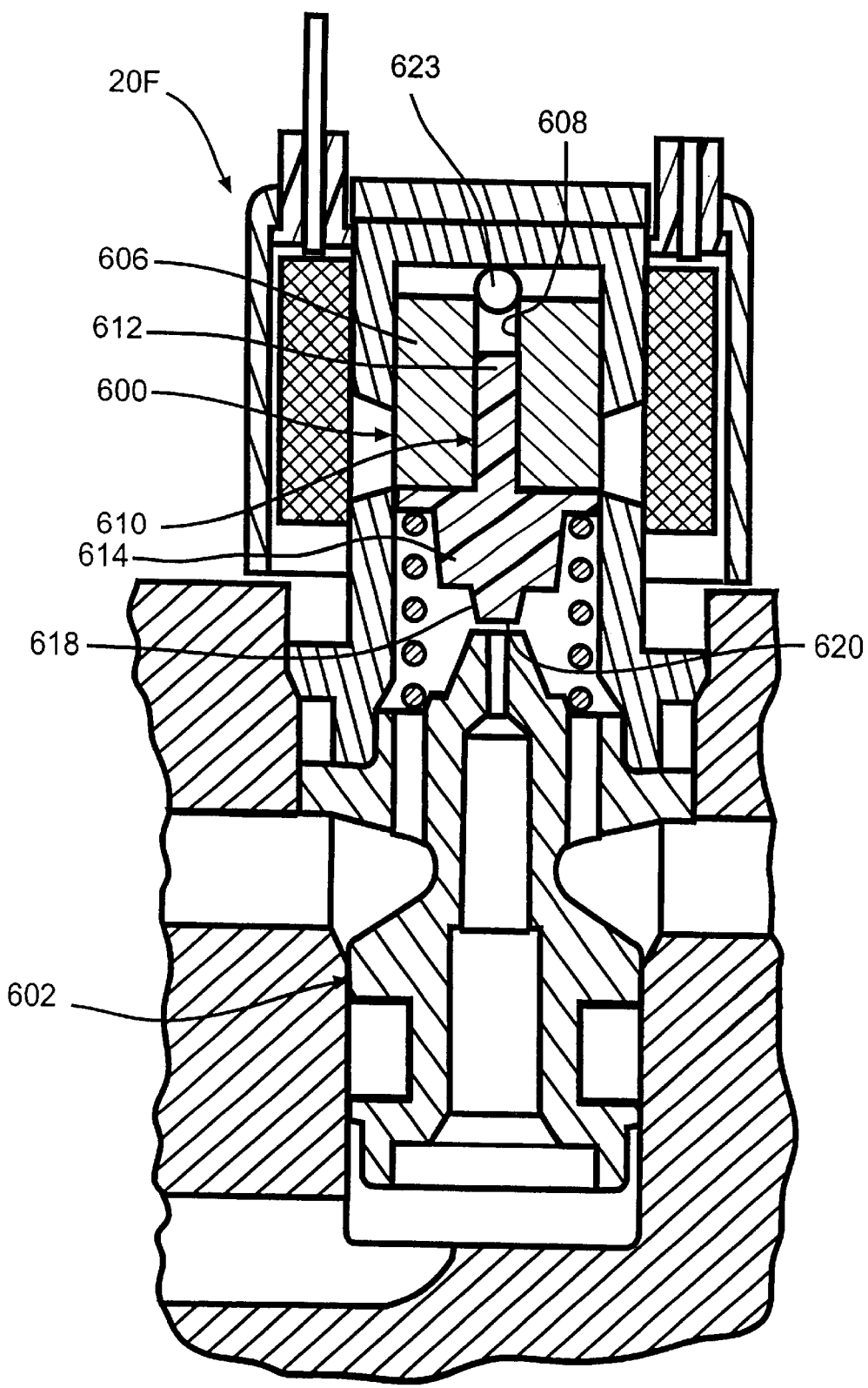
FIG. 18 is a sectional view through the hydraulic control unit of FIG. 1 illustrating a sixth embodiment of the normally open control valve according to this invention.

A sixth embodiment of control valve 20 for system 10 is indicated generally at 20F in FIG. 18. The normally open isolation valve 20F includes an armature 600 having an armature core 606 and an overmolded armature body 610. The armature body 610 includes a central section 612 and a first end section 614. The first end section 614 extends from the armature core 606 and has an outer diameter greater than the central section 612. The first section 614 terminates a projecting stub 618 having a planar end surface 620. The central section 612 does not extend from the armature core 606. A ball 623 is pressed into a bore 608 of the armature core 606 opposite the first end section 614.

The armature 600 cooperates with a valve seat 602 to permit and block fluid flow through the valve 20F in a manner similar to valve 20A. The end surface 620 engages the valve seat 602 to close the valve 20F.

Figure 19:
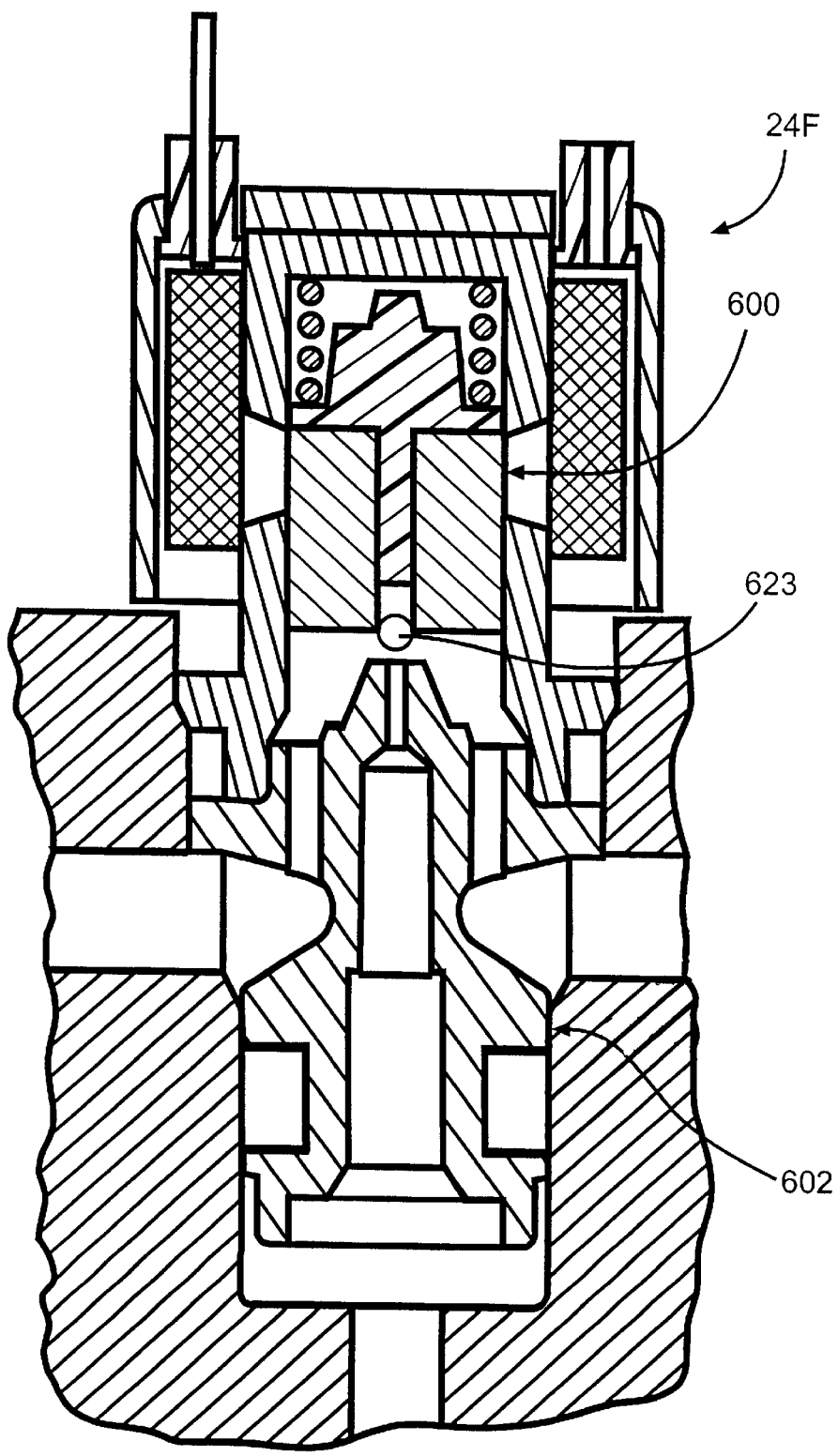
FIG. 19 is a sectional view through the hydraulic control unit of FIG. 1 illustrating a sixth embodiment of the normally closed control valve according to this invention.

A sixth embodiment of control valve 24 for system 10 is indicated generally at 24F in FIG. 19. The normally closed dump valve 24F includes an armature 600 identical to armature 600 of control valve 20F. Furthermore, dump valve 24F also includes other elements identical to control valve 20F, including valve seat 602. The armature 600 cooperates with a valve seat 602 to permit and block fluid flow through the valve 24F in a manner similar to valve 24A. The ball 623 is pulled away from the valve seat 602 to open the valve 24F.

Figure 20:
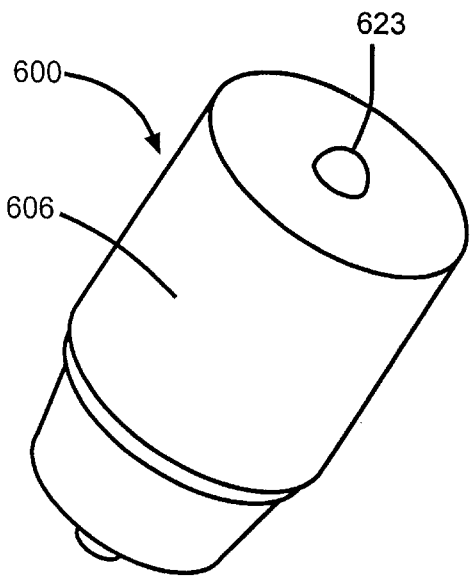
FIG. 20 is a perspective view of an armature removed from the control valves of FIGS. 18 and 19.
Figure 21:
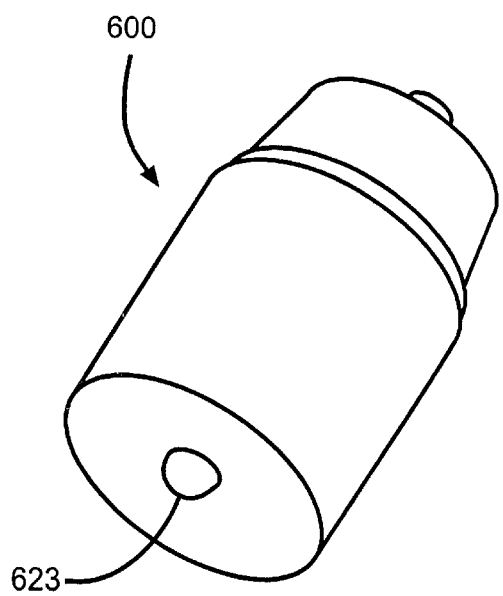
FIG. 21 is a perspective view of the armature of FIG. 20 rotated 180 degrees.

FIGS. 20 and 21 illustrate the armature 600 removed from the control valves 20F and 24F.

If desired, the valve bodies 102, 202, 302, 402, 502, and 602 can be formed from a moldable material such as plastic. A plastic valve body reduces the cost of manufacture and is not part of the magnetic circuit formed when the valve is energized.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A control valve for controlling fluid flow in a hydraulic control unit comprising:

a valve seat;

a sleeve mounted on the valve seat, the sleeve having a first ferromagnetic portion, a second ferromagnetic portion adjacent the valve seat, an annular region defining an area of increased magnetic reluctance between the first ferromagnetic portion and the second ferromagnetic portion of the sleeve, a first junction between the first ferromagnetic portion and the annular region, and a second junction between the second ferromagnetic portion and the annular region;

an electrical coil disposed about the sleeve; and an armature comprising:

a cylindrical central portion slidably received in the sleeve, the central portion having a first end surface at a first end of the armature central portion and a second end surface at a second end of the armature central portion opposite the first end of the armature central portion;

a first end section extending from the first end of the armature central portion, the first being at least one of a reduced diameter and formed of a material that is not ferromagnetic; and a second end section extending from the second end of the armature central portion, the first end section having a length greater than a length of the second end section, the second end section being at least one of a reduced diameter and formed of a material that is not ferromagnetic;

wherein the armature is adapted to be inserted in the sleeve in a first orientation with the first end of the central portion of the armature generally aligned with the first junction of the sleeve, the second end of the central portion of the armature disposed within the second ferromagnetic portion of the sleeve, and the armature disposed at an extreme of travel toward the valve seat with the coil deenergized; and wherein the armature is also adapted to be inserted in the sleeve in a second orientation opposite the first orientation with the first end of the central portion of the armature core being generally aligned with the second junction of the sleeve, the second end of the central portion of the armature disposed within the first ferromagnetic portion of the sleeve, and the armature disposed at another extreme of travel away from the valve seat with the coil deenergized.

2. The control valve according to claim 1 wherein the armature comprises:

an armature core slidably received in the sleeve, the armature core having a first planar end surface defining the first end surface of the armature central portion and a second planar end surface defining the second end surface of the armature central portion, the armature core defining a passage extending between the first planar end surface and the second planar end surface of the armature core; and an armature body formed of a moldable material, the armature body having a central section received in the passage of the armature core, a first end of the armature body extending from the first end surface of the armature core forming the first.

3. The control valve according to claim 1 including a spring engaging the armature to urge the armature toward the valve seat when the armature is in the first orientation.

4. The control valve according to claim 1 including a spring engaging the armature to urge the armature away from the valve seat when the armature is in the second orientation.

5. The control valve according to claim 1 wherein the annular region of increased magnetic reluctance comprises a portion of the sleeve in which a circumferentially extending groove is defined.

6. A control valve for controlling fluid flow in a hydraulic control unit comprising:

a valve seat;

a sleeve mounted on the valve seat, the sleeve having a first ferromagnetic portion, a second ferromagnetic portion adjacent the valve seat, an annular region defining an area of increased magnetic reluctance between the first ferromagnetic portion and the second ferromagnetic portion of the sleeve, a first junction between the first ferromagnetic portion and the annular region, and a second junction between the second ferromagnetic portion and the annular region;

an electrical coil disposed about the sleeve; and an armature comprising:

an armature core slidably received in the sleeve, the armature core having a first planar end surface at a first end of the armature core and a second planar end surface at a second end of the armature core opposite the first end of the armature core, the armature core defining a passage extending between the first planar end surface and the second planar end surface of the armature core; and an armature body formed of a moldable material, the armature body having a central section received in the passage of the armature core, a first end of the armature body extending from the first end surface of the armature core, and a second end of the armature core extending from the second end surface of the armature core, the first end of the armature body having a length greater than a length of the second end of the armature body;

wherein the armature is adapted to be inserted in the sleeve in a first orientation with the second end of the armature body disposed at an extreme of travel toward the valve seat when the coil is deenergized, a distance between the second end of the armature core and the second junction of the sleeve being greater than a distance between the first end of the armature core and the first junction of the sleeve; and wherein the armature is adapted to be inserted in the sleeve in a second orientation opposite the first orientation, the second end of the armature body being disposed at an extreme of travel away from the valve seat when the coil is deenergized, a distance between the second end of the armature core and the first junction of the sleeve being greater than a distance between the first end of the armature core and the second junction of the sleeve.

7. The control valve according to claim 6 including a spring disposed to urge the armature toward the valve seat when the armature is in the first orientation.

8. The control valve according to claim 6 including a spring disposed to urge the armature away from the valve seat when the armature is in the second orientation.

9. The control valve according to claim 6 wherein the annular region of increased magnetic reluctance comprises a portion of the sleeve in which a circumferentially extending groove is defined.

10. A control valve for controlling fluid flow in a hydraulic control unit comprising:

a sleeve mounted on a valve seat;

an armature slidably received in the sleeve, the armature having a predetermined shape; and a spring engaging one end of the armature, the armature and the spring defining an armature sub-assembly;

wherein, when the armature sub-assembly including the armature having the predetermined shape is disposed relative the sleeve and relative the valve seat in a first orientation, a normally closed valve is defined;

wherein, when the armature sub-assembly including the armature having the predetermined shade is disposed relative the sleeve and relative the valve seat in a second orientation opposite the first orientation, a normally open valve is defined; and wherein the sleeve and the valve seat are identical for both the normally closed valve and the normally open valve configurations.

11. The control valve according to claim 10 including an armature having more than one component part.

12. A control valve for controlling fluid flow in a hydraulic control unit comprising:

a housing;

a sleeve mounted within the housing, the sleeve having a first ferromagnetic portion, a second ferromagnetic portion adjacent the valve seat, an annular region defining an area of increased magnetic reluctance between the first ferromagnetic portion and the second ferromagnetic portion of the sleeve, a first junction between the first ferromagnetic portion and the annular region, and a second junction between the second ferromagnetic portion and the annular region;

an electrical coil disposed about the sleeve; and an armature comprising:

a cylindrical central portion slidably received in the sleeve, the central portion having a first end surface at a first end of the armature central portion and a second end surface at a second end of the armature central portion opposite the first end of the armature central portion;

a first end section extending from the first end of the armature central portion, the first end section being at least one of a reduced diameter and formed of a material that is not ferromagnetic; and a second end section extending from the second end of the armature central portion, the first end section having a length greater than a length of the second end section, the second end section being at least one of a reduced diameter and formed of a material that is not ferromagnetic;

wherein, when the armature is disposed in the sleeve in a first orientation, a normally closed valve is defined; and wherein, when the armature is disposed in the sleeve in a second orientation, a normally open valve is defined.

13. The control valve according to claim 12 including a spring disposed to urge the armature in a first direction when the armature is in the first orientation.

14. The control valve according to claim 12 including a spring disposed to urge the armature in a second direction opposite the first direction when the armature is in the second orientation.

15. A control valve for controlling fluid flow in a hydraulic control unit comprising:

a sleeve mounted on a valve seat;

an electrical coil disposed about the sleeve;

an armature slidably received in the sleeve, the armature having a predetermined shape; and a spring engaging one end of the armature, the armature and the spring defining an armature subassembly;

wherein, when the armature sub-assembly including the armature having the predetermined shape is disposed relative the sleeve and relative the valve seat in a first orientation, a normally closed valve is defined;

wherein, when the armature sub-assembly including the armature having the predetermined shape is disposed relative the sleeve and relative the valve seat in a second orientation opposite the first orientation, a normally open valve is defined; and wherein the sleeve and the valve seat are identical for both the normally closed valve and the normally open valve configurations.

* * * * *